March 5, 1963
H. F. EDWARDS
3,080,513
CAPACITOR SENSING AND REBALANCING SERVO SYSTEM
Filed Sept. 6, 1960
2 Sheets-Sheet 1
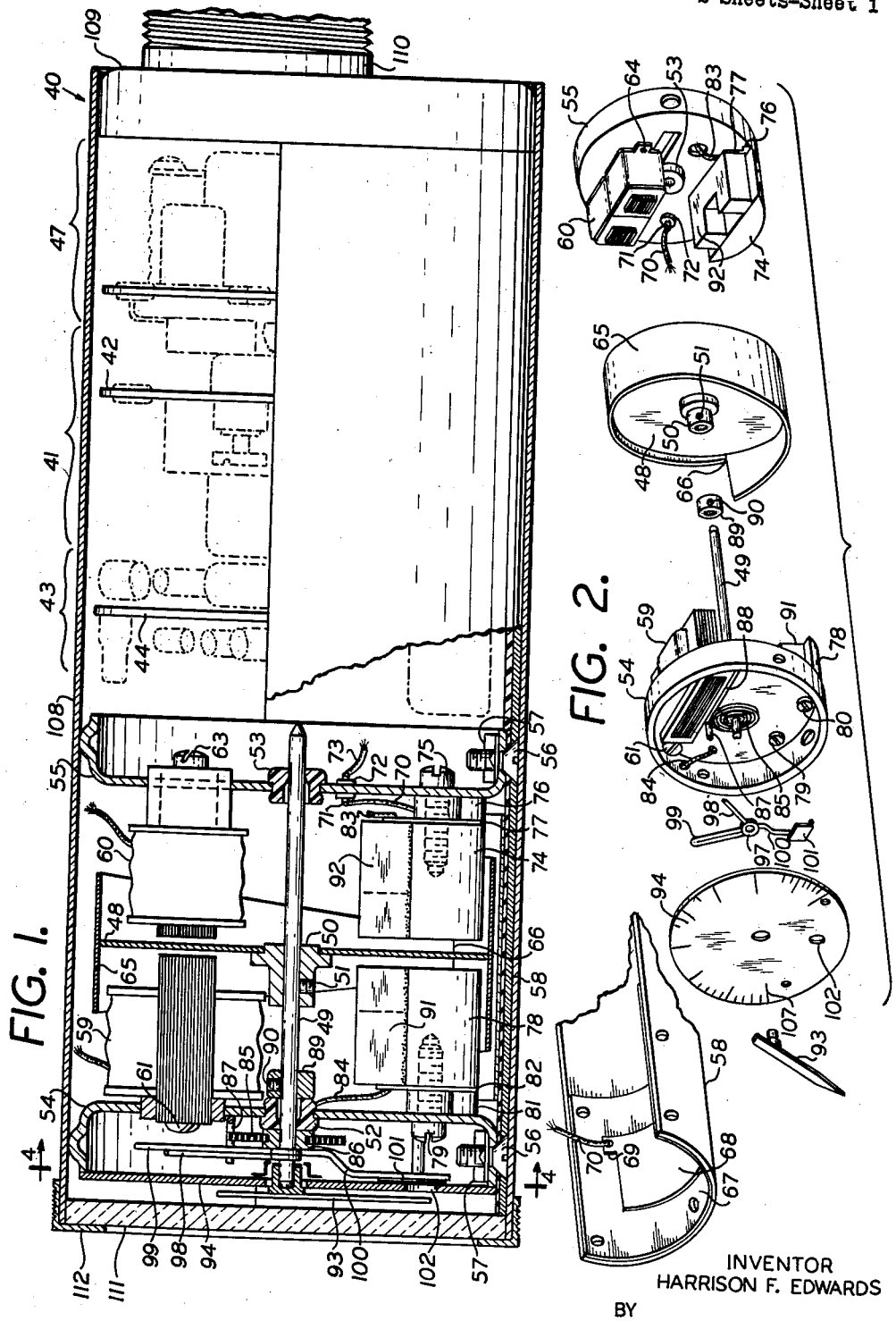
INVENTOR
HARRISON F. EDWARDS
BY
*Beverly Townsend, Watson & Churchill*
ATTORNEYS.

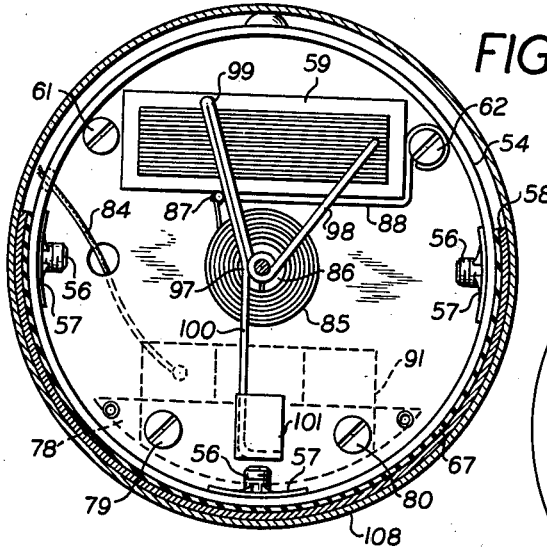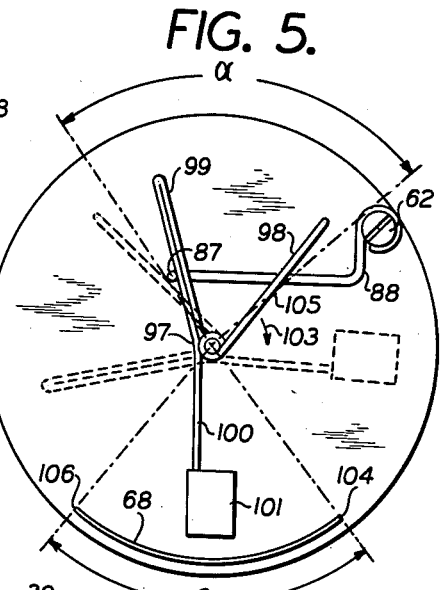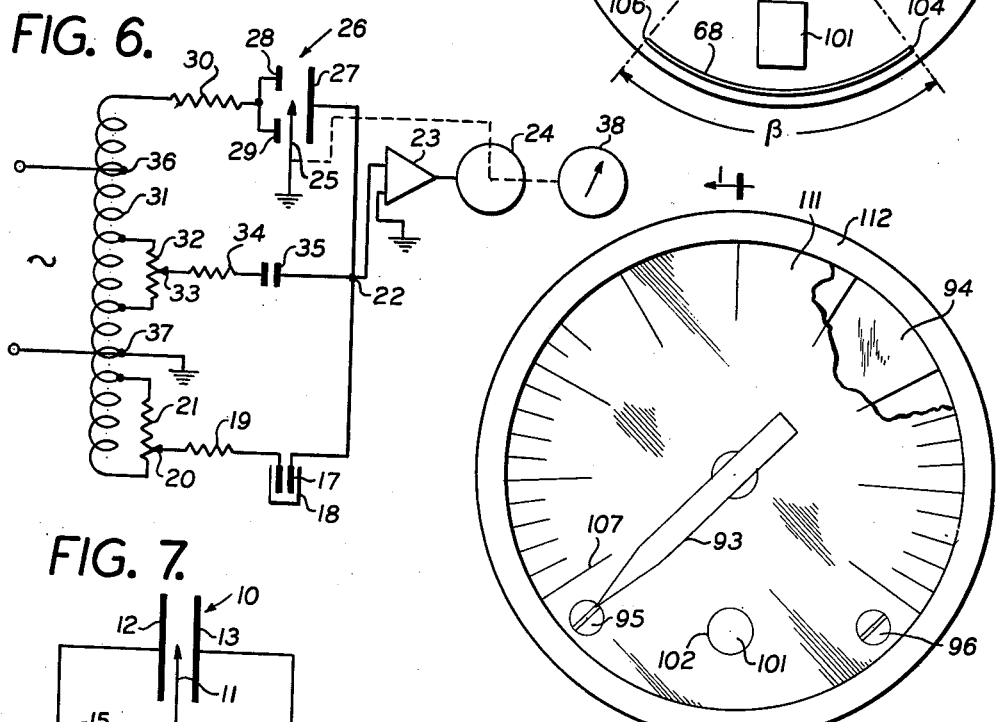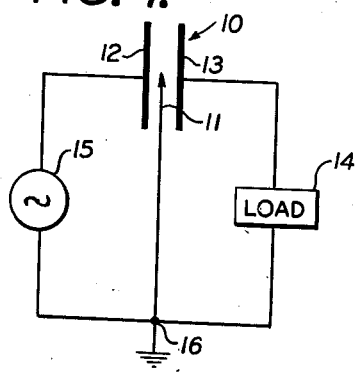

United States Patent Office 3,080,513
Patented Mar. 5, 1963

3,080,513
CAPACITOR SENSING AND REBALANCING
SERVO SYSTEM
Harrison F. Edwards, Ferrisburg, Vt., assignor to Simmonds Precision Products, Inc., Tarrytown, N.Y., a corporation of New York
Filed Sept. 6, 1960, Ser. No. 54,108
15 Claims. (Cl. 318—28)

The present invention relates to an adjustable capacitor and to a servo mechanism including a motor and rebalancing element for use in a low power servo system.

Low power servo systems find particular utility in indicating systems such as those used on aircraft for measuring and indicating fuel quantity, temperature and the like. An indicating system of this type is robust and accurate and can be applied readily to indicating at a remote point. Although such systems have many other uses, the present invention will be described with reference to aircraft fuel gaging in view of the special problems encountered therein and of the peculiar adaptability of the invention thereto.

Measuring fuel quantity on an aircraft poses several problems. It is necessary to have extreme accuracy particularly near the fuel empty condition. This dictates that the system be highly sensitive to slight change in quantity. However, while the aircraft is in flight the fuel is subjected to considerable sloshing, and, where an immersed condenser is used for gaging, the error signal will change instantaneously with the sloshing. This will result in a constantly changing or fluctuating indication unless the sensitivity is decreased or the system is heavily damped in an appropriate manner.

Some of the presently known systems employ motors with wound rotors. Because of restrictions on size the number of field poles must be kept to a minimum. Since the electrical current normally used on aircraft has a frequency of 400 c.p.s. this results in high synchronous motor speeds ranging from 6000 to 12,000 r.p.m. with 8000 r.p.m. being often the lowest practical limit.

To counteract the sloshing problem it has become common practice to hold the response time, i.e., the time required for the indicator to move from zero to full scale, to about 5 to 10 seconds. In order to accomplish this, however, it is necessary to employ a relatively high ratio gear train between the servo motor and the system rebalancing element. For reasons of accuracy the gear train must be a precision mechanism free from backlash and characterized by a minimum of retarding friction. These requirements have been responsible for keeping up the costs of such devices.

Dynamic instability is another problem which has to be coped with. Because of the mass of the motor armature or rotor it has substantial inertia. The kinetic energy stored in the rotor must be dissipated before the system will come to rest. If the loop gain is high with a low response time, the system will hunt or oscillate around a mean reading. Normally there is considerable friction in the gear train and this serves to damp the system and prevent oscillation with an attendant undesirable loss in sensitivity.

In larger servo systems the dynamic stability problem has been overcome by rate or derivative damping. However, this usually requires a tachometer type of generator mechanically coupled to the motor and coupled into a feedback loop. Obviously, this solution is neither practical nor feasible with small and low cost equipment.

Another problem with current designs is the resolution of the rebalance element which generally takes the form of a wire-wound potentiometer. The wire-wound is preferred over the carbon film type since the latter changes resistance appreciably with wear. However, the wire-wound does not provide a smooth and continuous resistance variation due to the jumping of the wiper from turn to turn.

With the known servo indicators the indication remains at its last reading in the event of power failure or malfunction of the amplifier or the like. Thus, no warning is provided to the reader unless a separate "power off" indicator is employed, and even this will not warn of a fault within the servo loop itself which results in deenergization of the indicator.

In the copending application of Stanley J. Smith for "Heavily Damped Eddy Current Motor Driven Servo Mechanism," Serial No. 51,908, filed August 25, 1960, and assigned to the same assignee as the present application, there is described and claimed a servo mechanism comprising an eddy current motor driving a shaft to which is directly coupled a variable capacitor. That mechanism with the many other features described in said application provides a low cost servo device which is virtually free from all of the above-enumerated disadvantages.

The adjustable capacitor employed in the aforesaid application comprises a plurality of parallel vanes mounted on a shaft for rotation relative to and interleaved with a set of spaced parallel stationary stator plates. The nature of the plates are such that the capacitor is quite critical with respect to proper concentric alignment of the shaft relative to the stator. End play in the shaft can also introduce an error into the aforesaid system. To overcome these difficulties it is necessary to work to very close tolerances during manufacture.

It has now been discovered that it is possible to provide a servo mechanism having all of the advantages of an adjustable capacitor directly driven by a heavily damped eddy current motor without the need for close tolerance fabrication and the like. Consequently it is an object of the present invention to provide a novel capacitor whose capitance is virtually independent of the relative spacing between its electrodes and of slight axial movement of its rotor due to end play or the like.

A further object of the present invention is to provide a novel servo mechanism wherein the rotors of both the motor and the capacitor can be formed as a single assembly or structure with attendant simplification in the construction.

In accordance with one aspect of the present invention there is provided a servo mechanism comprising a first capacitor electrode in the form of a hollow cylinder whose axial dimension varies continuously around its circumference with such axial dimension at no two points around said circumference being the same, the electrode being mounted coaxially upon a shaft for rotation, motor means coupled to the electrode for causing it to rotate, and a stationary capacitor electrode having a cylindrical surface of limited circumferential extent positioned concentrically adjacent the first electrode for operative cooperation therewith.

Preferably there are at least two stationary capacitor electrodes, one having a concavo-cylindrical surface of limited arcuate extent and positioned concentrically adjacent the external surface of the rotating electrode while the other has a convexo-cylindrical surface of limited arcuate extent positioned concentrically adjacent the internal surface of the rotating electrode with both stationary electrodes in radial alignment.

As a further aspect of the present invention, the capacitor can be employed in a control circuit comprising a source of alternating current, a load, means joining the source and the load in a series circuit interconnecting the stationary electrodes of the capacitor, means conductively coupling the rotatable electrode of the capacitor to the junction between the source and the load, and means for adjusting the rotatable electrode of the capacitor to vary the current through the load.

The invention will be better understood after reading the following detailed description with reference to the appended drawings in which:

FIG. 1 is a longitudinal sectional view with some parts shown only in phantom outline of a servo-indicator device embodying the various features of the present invention;

FIG. 2 is an exploded view of those parts of FIG. 1 which make up the servo mechanism and are shown in solid lines;

FIG. 3 is a front elevational view of the dial face of the device of FIG. 1;

FIG. 4 is a transverse sectional view behind the dial plate taken on line 4—4 in FIG. 1;

FIG. 5 is a diagrammatic representation of certain components of FIG. 4 for the purpose of better illustrating the relationship between certain of the parts;

FIG. 6 is a simplified schematic circuit diagram of a liquid measuring system incorporating the servo device of FIG. 1; and FIG. 7 is a schematic diagram of a more basic circuit arrangement embodying the present invention.

As previously mentioned, the present invention is being described as applied to an aircraft fuel gage. As is well known, a standard arrangement for measuring aircraft fuel is to provide a self-balancing bridge circuit for measuring changes in capacitance of a probe immersed in the fuel in a tank and indicating the fuel quantity as a function of such capacitance. Such a gage is generally referred to as of the capacitance type. In general, the known circuits employ a variable resistance element for rebalancing the bridge circuit. Although it was heretofore known that a variable condenser could be used as a rebalancing element circuits employing same have not seen much practical use.

A variable air capacitor, unlike a wire-wound potentiometer has infinite resolution and can be made virtually frictionless. Thus, the invention described in the aforesaid patent application makes use of the variable capacitor as its rebalancing element. Although the configuration of the capacitor plates employed in the apparatus of the aforesaid application is believed to be novel, the general arrangement of the electrodes is conventional as well as the electrical circuit in which it is used.

The present invention, however, employs an entirely novel condenser as well as a novel circuit. In order to be further able to understand the description of the physical components, it will be helpful to have in mind the circuit utilizing same. For this reason, reference should now be had to FIG. 7.

The novel condenser, which will be described in greater detail hereinafter, is designated generally by the reference numeral 10. It comprises an adjustable electrode or plate 11, a first fixed or stationary electrode 12 and a second stationary electrode 13. The electrodes 12 and 13 are parallel, spaced apart, and mutually insulated. The electrode 11 is arranged to move into and out of the space between the electrodes 12 and 13. A suitable load 14 is connected in series with a source of alternating current 15 between the stationary plates 12 and 13 of the capacitor. The electrode 11 is conductively connected to the junction 16 between the load 14 and the source 15. If desired, the junction 16 may be connected to ground.

In the absence of electrode 11, a predetermined capacitance will exist between the electrodes 12 and 13. This will result in a certain magnitude of current flowing from the source 15 through the capacitor consisting of plates 12 and 13 to the load 14. As the electrode 11 is inserted between the electrodes 12 and 13 it will reduce the capacitance between the latter two electrodes. Increasing capacitance will develop between the electrodes 11 and 12 and between the electrodes 11 and 13. The capacitance between electrodes 11 and 12 will shunt or by-pass the source 15. The capacitance between electrodes 11 and 13 will be seen to be coupled in parallel with the load 14. Thus, as electrode 11 is inserted between electrodes 12 and 13, the current flowing through the load 14 will be reduced. In other words, as electrode 11 is adjusted the current through the load is varied. One of the advantages of the circuit just described, is that the current drawn from the source 15 is maintained substantially constant while the current through the load is being varied. Other advantages will be apparent from the further discussion to follow.

Reference should now be had to FIG. 6 which illustrates a circuit for applying the invention to an aircraft fuel gage. A condenser such as 17 is provided for immersion in the fuel in a tank 18. This condenser is connected in series with a current limiting resistor 19 between the slider 20 of a potentiometer 21 and an input terminal 22 of a detector-amplifier or servo amplifier 23 which drives a servo motor 24. The servo motor is mechanically coupled to an adjustable electrode or rotor 25 of a variable capacitor 26 (similar to capacitor 10 of FIG. 7). The capacitor 26 has a first stationary electrode 27 on one side of the electrode 25 and a pair of stationary electrodes 28 and 29 on the other side of the electrode 25. The electrode 27 is electrically connected to the input terminal 22, as shown. The electrodes 28 and 29 are connected together and through a current limiting resistor 30 to an end terminal of the winding 31 of a transformer which may be of the autotransformer type. The resistance element of the potentiometer 21 is connected across a portion of the opposite end of the winding 31, as shown. A further potentiometer 32 is connected across a middle portion of the winding 31. The slider 33 of the potentiometer 32 is connected through a current limiting resistor 34 and a small capacitor 35 to the terminal 22. The transformer winding 31 has taps 36 and 37 connected to a source of alternating current. The tap 37 is also connected to ground as represented by the conventional symbol. It should be observed that the adjustable electrode 25 of the capacitor 26 is also connected to ground. Finally, the motor 24 is mechanically coupled to an indicator 38.

The resemblance between the circuit of FIG. 7 and the upper portion of the circuit of FIG. 6 should now be apparent. Capacitors 10 and 26 function in precisely the same manner. As the electrode 25 enters between the electrode 27 on one side and the electrodes 28 and 29 on the other side, the capacitance between the stationary electrodes will be gradually decreased. Electrodes 28 and 29 may be considered as a single electrode similar to electrode 12 of FIG. 7. The reason for constructing the electrode in two parts is based upon mechanical considerations which will be apparent from a discussion of the physical embodiment.

Although not shown, the motor 24 will be provided with a reference field supply in quadrature with respect to the output of the bridge circuit. As the capacitance of condenser 17 varies with change in liquid level or dielectric constant, the motor 24 will be energized to reposition the capacitor 26 to rebalance the bridge until zero voltage exists between the terminal 22 and ground. The indicator 38 coupled to the motor can be calibrated to indicate fuel quantity.

When the tank 18 is empty, condenser 17 will have minimum capacitance. It is arranged that the capacitor 26 will also have some predetermined minimum capacitance when it is intended that the indicator 38 point to the zero or empty position. The potentiometer 21 is provided as an adjustment to vary the voltage applied to the condenser 17 for setting the indicator precisely at the empty or zero position. The potentiometer 32 is an adjustment for setting the indicator to the desired full reading when the tank 18 is full. It is believed that the nature of these adjustments are such that they will be well understood by those skilled in the art. Other adjustments may be provided in accordance with known practice.

Reference should now be had to FIGURES 1 to 5 wherein the same reference numerals are employed to designate the same or similar parts throughout. In the particular embodiment chosen for purpose of explanation, and referring particularly to FIG. 1, it will be observed that all of the components of FIG. 6 are enclosed in a single housing 40 with the exception of the capacitor immersed in the fuel tank.

The phantom outlines in the region 41 represent the components of the bridge circuit. These may be mounted on an insulated wafer or disc 42. The components of the detector-amplifier are located generally in the space 43 mounted on the insulated wafer 44. The rebalancing capacitor and servo motor are illustrated in detail by the solid lines to the left in FIG. 1 as the drawing is viewed. For purpose of standardization all of the devices are made to operate on 400 cycle current. However, if alternating current to operate the bridge is not available, a converter stage in space 47 may be provided, as shown. This might be the situation in a helicopter.

The eddy current motor consists of a conductive disc rotor 48 mounted in driving relation upon a shaft 49 by means of the bushing or hub 50 and the set screw 51. In order to keep frictional losses at a minimum the shaft 49 is journaled in bearings 52 and 53 of moulded polytetrafluoroethylene carried, respectively, in end bells 54 and 55. The end bells are secured by means of the screws 56 and speed nuts 57 in a hemi-cylindrical shell or chassis 58. These details are best seen in FIG. 4.

In known manner, reference and signal field structures 59 and 60 are mounted on the end bells so as to be operatively positioned near the outer edge of the rotor disc 48. The frame for the field structure 59 may be bolted to the end bell 54 by means of the screws 61 and 62. In similar manner the structure 16 may be bolted to the end bell 55 by screws 63 (see FIG. 1) and 64 (see FIG. 2). It will be understood that the field structure 59 has an E-shape core while the structure 60 has a C-shape core.

In line with the basic concept of maintaining retarding friction at a minimum, the servo system rebalancing element is directly coupled in driven relation to the shaft 49. That is, the rotor of the rebalancing capacitor consists of a tapered electrode 65 formed into a hollow cylinder and secured to the periphery of the disc 48 in coaxial relation thereto. It will be best seen from FIG. 2 that the electrode 65 is continuously tapered from a minimum axial length starting at the point of discontinuity 66 and proceeding in a clockwise direction to a maximum axial length back at the point of discontinuity 66. Whereas the disc 48 may be formed from a sheet of aluminum or copper, it will be found convenient to form the electrode 65 from a flexible plastic base upon whose surface has been deposited a conductive metallic coating. Any other suitable method may be employed so long as steps are taken to ensure conductive contact between the metallic coating or operative surface of electrode 65 and the metallic disc 48.

As best seen in FIG. 2, the inner surface of the shell or chassis 58 is covered over one end by a layer of insulating material 67. A thin sheet of polyethylene terephthalate resin has been found satisfactory for this purpose. A fixed capacitor electrode 68 having a cylindrical surface of limited circumferential extent is provided by depositing a metallic film or layer upon the insulated layer 67. The electrode 68 in FIGURES 1 to 5 corresponds to the electrode 27 in FIG. 6.

Referring again to FIG. 2, a small extension may be provided on the electrode layer 68 at 69 for the purpose of providing an area to which may be attached by soldering a lead or wire 70. In certain instances the extension 69 may be omitted and the wire 70 connected directly to a corner of layer 68. It will be seen from FIG. 1 that the wire 70 is connected at its free end to a feed through 71 supported in an insulator 72 carried by the end bell 55. A further connection 73 is made to the opposite end of the feed through 71 in order to join it to the input of the amplifier-detector. This connection would be similar to the connection between the electrode 27 and the input to the amplifier 23 in FIG. 6.

In order to distinguish between the various electrodes it will be apparent that the electrode 68 has a concavo-cylindrical surface positioned concentrically adjacent the external surface of the tapered electrode 65. At least one other stationary capacitor electrode 74 is provided having a convexo-cylindrical surface of limited arcuate extent, and this is positioned concentrically adjacent the internal surface of the tapered electrode 65 in radial alignment with the first mentioned stationary electrode 68. As best seen in FIG. 2, the electrode 74 may be in the form of a section of a cylinder, and it is preferably made of some light material such as aluminum. Plastic screws such as 75 are employed to insulatingly mount the electrode 74 on the end bell 55 spaced therefrom by an insulated spacer 76. A thin sheet of copper 77 may be sandwiched between the electrode 74 and the insulator 76 in order to provide means for establishing electrical connection to the electrode 74. A substantially identical electrode 78 is mounted on the end bell 54 by means of the insulated screws 79 and 80 (best seen in FIG. 4). The electrode 78 is insulated from the end bell 54 by means of the insulated spacer 81. Sandwiched between the electrode 78 and the insulator 81 is a thin sheet of copper 82 for a purpose similar to the sheet 77. Connecting wires 83 and 84 may be soldered or otherwise attached to the sheets 77 and 82 for connecting the electrodes 74 and 78 together and to the transformer of the bridge circuit. Electrodes 74 and 78 correspond, respectively, to electrodes 28 and 29 in FIG. 6. It should now be understood that the split nature of the electrodes 74 and 78 is dictated by the nature of the combined capacitor and servo motor rotor.

In order to make electrical connection with the electrode 65 of the capacitor, a spiral hair spring 85 is mounted on a metallic bushing 86 with its inner end soldered or otherwise connected thereto. The bushing 86 is mounted on the exposed end of the shaft 49 after it passes through the bearing 52. This is all better seen in FIG. 4.

The outer end of hair spring 85 is joined to an axially extending arm or stop 87 at the end of a rigid wire form 88 supported on the end bell 54 by means of the mounting screw 62. (See FIG. 4.) Since the end bell 54 is electrically connected to the shell 58 by means of the metal screws 56, the electrode 65 of the capacitor will be effectively connected to the shell through the rotor disc 48, the shaft 49, the hair spring 85, the wire form 88, the screw 62, and the end bell 54. It is to be understood that the shell 58 represents circuit ground to which will be connected the low potential or reference terminal of the amplifier-detector.

It will be noted from FIG. 1 that the bushing 86 abuts the bearing 52 to prevent axial movement of the rotating assembly to the right. In order to prevent movement of the shaft 49 to the left there is mounted thereon a collar 89 fixed by a set screw 90. The collar 89 abuts the opposite surface of the bearing 52.

A pair of C-shape permanent magnets 91 and 92 are mounted, respectively, on the electrodes 78 and 74 so as to provide rate derivative damping for the disc 48 of the motor. The strength of these magnets as well as their relative spacing is chosen to provide a relatively high degree of damping as will be more fully explained hereinafter.

In order to provide an indication, a pointer 93 is press fitted upon the end of the shaft 49, as shown. A dial plate 94 is positioned immediately behind or below the pointer 93 secured to the end bell 54 by the screws 95 and 96. The latter, are best seen in FIG. 3.

For a purpose to be described, a generally Y-shape member 97 is formed from stiff wire and mounted on the end of shaft 49 between the hair spring 85 and the pointer 93. The member 97 is provided with three generally radially projecting arms 98, 99 and 100. As best seen in FIG. 4, the arm 98 constitutes one end of the wire member while the arm 100 constitutes the other end. The inner end of the arm 98 takes one turn around the shaft 49 and then projects radially outwardly to provide the arm 99. The returning leg of arm 99 passes contiguously to the shaft 49 and then downwardly to provide the arm 100. From FIG. 1 it will be seen that the arm 100 is provided with an off-set so that its end lies closely adjacent the dial plate 94. From FIG. 4 it will be seen that the end of the arm 100 is L-shape and carries a signal "flag" 101. The flag 101 may consist of pasteboard or any other suitable material preferably colored.

At this point, we can consider the further function of the hair spring 85. This spring is deliberately made very light so that it will not adversely interfere with the operation of the servo motor and rebalance element during normal operation of the gage circuit. However, if power to the motor should be interrupted so as to remove any driving torque, the force developed by the spring 85 will be adequate to rotate the shaft 49 and the pointer 93 towards the zero position on the dial. Rotation will continue until the arm 99 engages the axial extension or stop 87 to which the end of the hair spring is attached. In this position of the arm 99 the flag 101 will appear opposite a window 102 in the dial plate 94 in order to inform the observer that power to the indicator has been interrupted.

It will be understood by those skilled in the art that in order to avoid ambiguity in operation of the system, the capacitance of the rebalance capacitor must always change in the same direction for a given direction of shaft rotation. Thus, if shaft rotation is as shown by the arrow 103 in FIG. 5, some means must be provided to limit such rotation when the rotor 48 with electrode 65 reaches a position with the discontinuity 66 just approaching the edge 104 of the electrode 68. This limiting action can be achieved by proper location of the arm 98 of the member 97. Thus, when the arm 98 reaches the position shown in dashed lines in FIG. 5 it will engage the extension 87. As previously mentioned, the opposite end of the movable range is limited by engagement of arm 99 with the extension 87. This position is shown by the solid lines in FIG. 5. The magnitude of the occluded angle provided by the arms 98 and 99 is represented by α in FIG. 5. This angle is defined by lines drawn from the center of the shaft 49 through the point 105 on the arm 98 in both of its extreme limiting positions. The point 105 represents the point of engagement with the extension 87 in the dashed position of the member 97.

It will also be observed from FIG. 5 that the circumferential extent of the electrode 68 is designated by the angle β. By selecting the angle α so that it is equal or larger than the angle β, the limiting action will be such that the discontinuity 66 in the electrode 65 will never effectively overlie or be in operative cooperation with the electrode 68. Thus, in the below zero limiting position of the indicator, the discontinuity 66 of the electrode 65 will be somewhere to the left of the edge 106 of the electrode 68 as viewed in FIG. 5. It should also be understood that in this position of the rotor assembly, the maximum area of electrode 65 will be positioned between the electrode 68 on one side and the electrodes 74 and 78 on the other side. As previously described, this will result in minimum capacity existing between the electrode 68 and the electrodes 74 and 78.

In the foregoing discussion the angle occupied by electrodes 74 and 78 has been ignored to simplify the description. However, it will be understood that the angle β delimits the effective area between electrode 68 on the one hand and electrodes 74 and 78 on the other hand and may not coincide with the extent of electrode 68.

As shown in FIG. 3, the pointer 93 is arranged to move to a below zero position when the indicator is deenergized and the flag 101 appears in window 102. The zero position is represented by the index mark 107.

After all of the components of the system are mounted in the half cylinder 58, the assembly is slipped within a tubular housing 108. One end of the housing 108 is sealed by the end closure 109 carrying the electrical plug housing 110. The opposite end of the tube 108 is sealed by a transparent window 111 secured in place by a bezel 112. If desired, the tube 108 may be evacuated and filled with an inert gas.

As was described in the aforesaid patent application, if all of the moving parts are in dynamic balance, the only force to be overcome by the motor will be that due to friction and the slight restoring force of the spring 85. Friction is contributed solely by the bearings 52 and 53, and by making them a polytetrafluoroethylene, this is kept at a minimum. By their very nature the rotating parts have very low inertia. Thus, in the absence of the damping magnets 91 and 92, the motor would tend to operate at an extremely high speed whenever energized. An extremely strong damping field must, therefore, be provided so as to reduce the speed to some practical value. A figure that has been found satisfactory is approximately 30 r.p.m. This speed is not high enough to provide sufficient kinetic energy to cause more than one minor overshoot. If zero to full scale travel represents 270° then it will take 1.5 seconds for the pointer to sweep the entire dial.

Because the magnets 91 and 92 develop zero retarding force when the velocity of the rotor 48 is zero, the motor is highly sensitive to small error signals. In fact, it is readily possible to render the system over-sensitive and unstable if the damping force is not adequate.

If the torque developed by the hair spring 85 is found to be objectionable during normal operation of the device, a steady signal bias may be applied to the motor to counteract it. Since the signal bias will also disappear if there should be a power failure, this will not interfere with the operation of the power "Off" signal provided by the flag 101 on the arm 100.

The multiple functions of several of the components should be evident from the foregoing description. Thus, the member 97 functions both as a limiting means as well as a signalling element. The hair spring 85 functions both to provide an electrical connection to the capacitor rotor and to provide a restoring force to the motor shaft when the motor is deenergized.

It should be understood that the tapered profile of the electrode 65 of the rebalancing capacitor may be varied in order to provide any desired characteristic to the circuit operation. However, it will be understood that the axial length of the electrode 65 must change always in the same direction as one proceeds in a continuous path around the electrode from the discontinuity back to the discontinuity.

Since the actual capacitance between the electrode 65 and the several stationary electrodes does not affect the usable capacitance of the capacitor, any eccentricity or lateral displacement in the location of the shaft 49 will have no effect on the capacitance between the electrodes 74 and 78 on the one hand and the electrode 68 on the other hand. At the same time, if the axial length of the electrode 68 is made greater than the widest portion of the electrode 65 it will be apparent that slight axial movement of the electrode 65 will have no effect upon the capacitance between the stationary plates.

In the embodiment chosen for purpose of illustration, the tapered electrode 65 is disposed symmetrically with respect to the rotor disc 48. However, it will be readily appreciated that many changes may be made in the construction of the rotor assembly and symmetry is not essential.

For use as a servo indicator the rebalance capacitor is conveniently integrated with the motor rotor. In other uses of the invention it should be apparent that the grounded rotor rebalancing capacitor can be used as a separate device coupled to a motor, gear train, position transducer, and the like. The capacitor can also be made in any length along the axis of rotation to satisfy absolute capacitance values which might be required.

Having described in detail the invention with reference to a presently preferred embodiment thereof, it is to be understood that the details thereof may be varied or modified as will appear to those skilled in the art without departing from the true spirit of the invention as defined in the appended claims.

What is claimed is:

1. A servo mechanism comprising an eddy current disc mounted on a shaft passing through its center for driving said shaft, a tapered capacitor electrode formed into a hollow cylinder having a point of discontinuity at the juncture of maximum and minimum axial dimension and secured to the periphery of said disc in coaxial relation thereto, reference and signal field structures supported operatively adjacent said disc for causing rotation thereof when suitably energized, a fixed capacitor electrode having a cylindrical surface of limited circumferential extent positioned concentrically adjacent said tapered electrode for operative cooperation therewith, and means for limiting rotation of said shaft to less than 360°, such that said point of discontinuity is precluded from overlying said fixed electrode.

2. A servo mechanism according to claim 1, further comprising means for damping the rotation of said shaft for stabilizing the mechanism to a predetermined response time constant.

3. A servo mechanism according to claim 1, wherein said means for limiting rotation comprises a member secured to said shaft for rotation therewith and having at least two radially directed arms, one arm carrying a signal element, fixed stop means positioned in the path of rotation of said other arm to limit rotation of said shaft, and spring means coupled between said shaft and a fixed point for tending to rotate said shaft in one direction until said other arm engages said stop means, said spring means having insufficient tension to prevent rotation of said shaft in the opposite direction when said field structures are suitably energized, provision being made for said signal to provide a visible manifestation when said arm engages said stop means.

4. A servo mechanism comprising a tapered capacitor electrode formed into a hollow cylinder and mounted coaxially upon a shaft for rotation, motor means coupled to said electrode for causing it to rotate, a stationary capacitor electrode having a cylindrical surface of limited circumferential extent positioned concentrically adjacent said tapered electrode for operative cooperation therewith, and means for limiting the rotation of said shaft to less than 360° such that the capacitance between said electrodes always changes in the same direction for a given direction of rotation.

5. A servo mechanism comprising a tapered capacitor electrode formed into a hollow cylinder and mounted coaxially upon a shaft for rotation, motor means coupled to said electrode for causing it to rotate, a first stationary capacitor electrode having a concavo-cylindrical surface of limited arcuate extent positioned concentrically adjacent the external surface of said tapered electrode for operative cooperation therewith, and at least one other stationary capacitor electrode having a convexo-cylindrical surface of limited arcuate extent positioned concentrically adjacent the internal surface of said tapered electrode in radial alignment with said first mentioned stationary electrode.

6. A servo mechanism comprising a first capacitor electrode in the form of a hollow cylinder whose axial dimension varies continuously around its circumference except for one point of discontinuity with such axial dimension at no two points around said circumference being the same, said electrode being mounted coaxially upon a shaft for rotation, motor means coupled to said electrode for causing it to rotate, a stationary capacitor electrode having a cylindrical surface of limited circumferential extent positioned concentrically adjacent said first electrode for operative cooperation therewith, and means for limiting rotation of said shaft to less than 360°, such that said point of discontinuity is precluded from overlying said stationary electrode.

7. A servo mechanism according to claim 6, wherein the axial extent of said stationary electrode is everywhere greater than the maximum axial dimension of said first electrode, and said stationary electrode is positioned relative to said first electrode such that the former always overlaps both ends of the latter.

8. A servo mechanism according to claim 6, wherein said means for limiting rotation comprises a member secured to said shaft for rotation therewith and having at least two radially directed arms, one arm carrying a signal element, fixed stop means positioned in the path of rotation of said other arm to limit rotation of said shaft and spring means coupled between said shaft and a fixed point for tending to rotate said shaft in one direction until said other arm engages said stop means, said spring means having insufficient tension to prevent rotation of said shaft in the opposite direction when said motor means is suitably energized, provision being made for said signal to provide a visible manifestation when said arm engages said stop means.

9. A variable capacitor comprising a first capacitor electrode in the form of a hollow cylinder whose axial dimension varies continuously around its circumference except for one point of discontinuity with such axial dimension at no two points around said circumference being the same, said electrode being mounted coaxially upon a shaft for rotation, and a stationary capacitor electrode having a cylindrical surface of limited circumferential extent positioned concentrically adjacent said first electrode for operative cooperation therewith.

10. A variable capacitor according to claim 9, wherein the axial extent of said stationary electrode is everywhere greater than the maximum axial dimension of said first electrode, and said stationary electrode is positioned relative to said first electrode such that the former always overlaps both ends of the latter.

11. A variable capacitor comprising a capacitor electrode tapered uniformly throughout its length and formed into a hollow cylinder, said electrode being mounted coaxially upon a shaft for rotation, and a stationary capacitor electrode having a cylindrical surface of limited circumferential extent positioned concentrically adjacent said tapered electrode for operative cooperation therewith.

12. A variable capacitor comprising a tapered capacitor electrode formed into a hollow cylinder and mounted coaxially upon a shaft for rotation, a first stationary capacitor electrode having a concavo-cylindrical surface of limited arcuate extent positioned concentrically adjacent the external surface of said tapered electrode for operative cooperation therewith, and at least one other stationary capacitor electrode having a convexo-cylindrical surface of limited arcuate extent poistioned concentrically adjacent the internal surface of said tapered electrode in radial alignment with said first mentioned stationary electrode.

13. A variable capacitor comprising a first capacitor electrode in the form of a hollow cylinder whose axial dimension varies continuously around its circumference with such axial dimension at no two points around said circumeference being the same, said electrode being mounted coaxially upon a shaft for rotation, a stationary capacitor electrode having a concavo-cylindrical surface of limited arcuate extent positioned concentrically adjacent the external surface of said first electrode for operative cooperation therewith, and at least one other stationary capacitor electrode having a convexo-cylindrical surface of limited arcuate extent positioned concentrically adjacent the internal surface of said first electrode in radial alignment with said first mentioned stationary electrode.

14. A servo system comprising a first capacitor electrode in the form of a hollow cylinder whose axial dimension varies continuously around its circumference with such axial dimension at no two points around said circumference being the same, said electrode being mounted coaxially upon a shaft for rotation, a stationary capacitor electrode having a concavo-cylindrical surface of limited arcuate extent positioned concentrically adjacent the external surface of said first electrode for operative cooperation therewith, at least one other stationary capacitor electrode having a convexo-cylindrical surface of limited arcuate extent positioned concentrically adjacent the internal surface of said first electrode in radial alignment with said first mentioned stationary electrode, a source of alternating current having a first phase, a servo amplifier, means joining said source and an input of said amplifier in a series circuit interconnecting said stationary electrodes, means conductively coupling said first electrode to the junction between said source and said amplifier input, means for supplying said amplifier input with an alternating current control signal of phase opposite to said first phase, and motor means coupled to an output of said amplifier for repositioning said first electrode to establish system balance.

15. A control circuit comprising a source of alternating current, a load, a first capacitor electrode in the form of a hollow cylinder whose axial dimension varies continuously around its circumference with said axial dimension at no two points around said circumference being the same, said electrode being mounted coaxially upon a shaft for rotation, a stationary capacitor electrode having a concavo-cylindrical surface of limited arcuate extent positioned concentrically adjacent the external surface of said first electrode for operative cooperation therewith, at least one other stationary capacitor electrode having a convexo-cylindrical surface of limited arcuate extent positioned concentrically adjacent the internal surface of said first electrode in radial alignment with said first mentioned stationary electrode, means joining said source and said load in a series circuit interconnecting said stationary electrodes, means conductively coupling said first electrode to the junction between said source and said load, and means for adjustably rotating said first electrode to vary the current through said load.

References Cited in the file of this patent

UNITED STATES PATENTS

| | | |
|---|---|---|
| 2,667,615 | Brown | Jan. 26, 1954 |
| 2,962,641 | Maltby et al. | Nov. 29, 1960 |

OTHER REFERENCES

Kretzmann, R.: Industrial Electronics Handbook, Third Ed., page 38, Figures 3–15; Phillips Incandescent Lamp Co., Eindhoven, Holland, 1958.